F. T. CLAYTON.
VALVE FOR PNEUMATIC TIRES.
APPLICATION FILED AUG. 1, 1908.
935,837.
Patented Oct. 5, 1909.
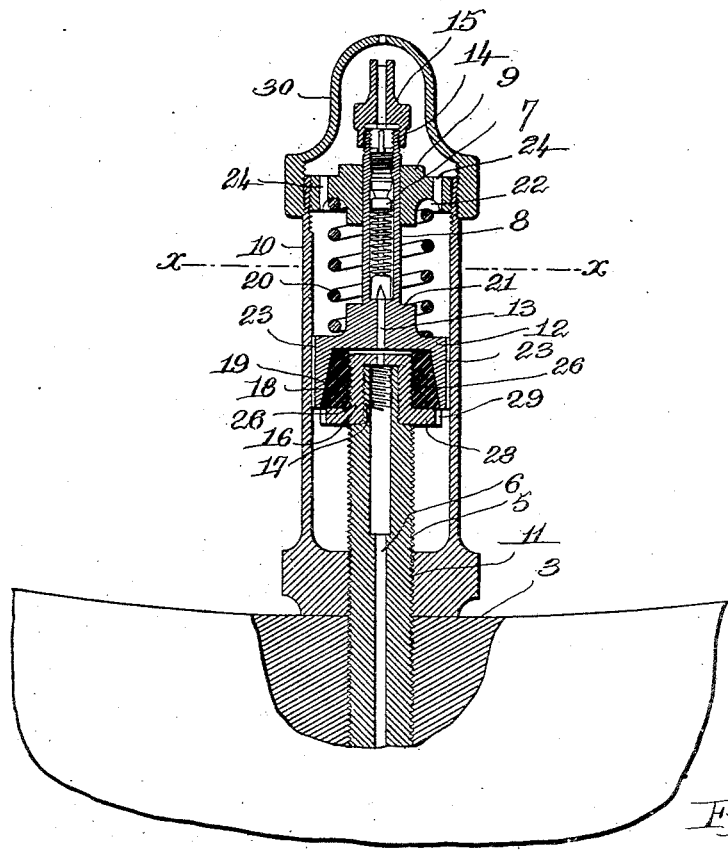
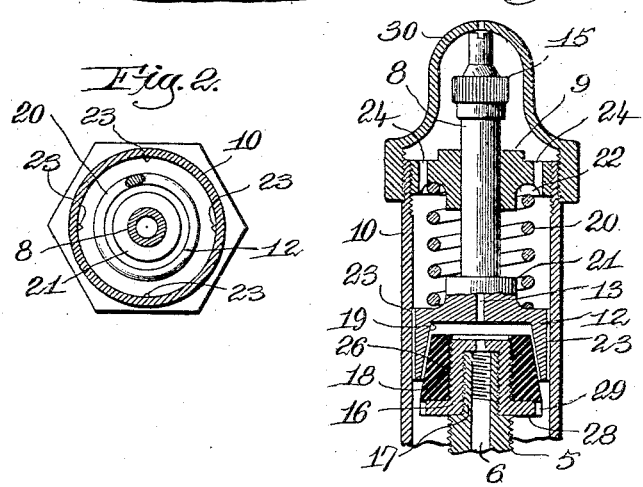
Witnesses.
Thomas J. Drummond
Edward H. Allen
Inventor.
Fred T. Clayton,
by Censly & Gregory Attys.

UNITED STATES PATENT OFFICE.

FRED T. CLAYTON, OF SANDWICH, MASSACHUSETTS.

VALVE FOR PNEUMATIC TIRES.

935,837.

Specification of Letters Patent.

Patented Oct. 5, 1909.

Application filed August 1, 1908. Serial No. 446,388.

*To all whom it may concern:*

Be it known that I, FRED T. CLAYTON, a citizen of the United States, residing at Sandwich, county of Barnstable and State of Massachusetts, have invented an Improvement in Valves for Pneumatic Tires, of which the following description, in connection with the accompanying drawing, is a specification, like numerals on the drawing representing like parts.

This invention relates to valves for pneumatic tires and it has for its object to provide a novel construction which includes a safety valve which will relieve the pressure in the tire in case it becomes excessive.

One of the common causes for the blowing up of pneumatic tires on automobiles is that the air in the tire becomes heated from one cause or another thereby producing a sufficiently excessive pressure within the tire to burst the latter. After a pneumatic tire as now commonly made has been pumped up and has been disconnected from the pump, there is no way of ascertaining the amount of pressure within the tire nor of automatically relieving any excessive pressure which may be produced within the tire by the heating of the air therein. As a result it not infrequently happens that a motorist suddenly finds that his tire has blown up.

The object of my invention is to provide a novel valve for pneumatic tires which includes in its construction not only the ordinary check valve which is used to prevent the escape of the air but which also includes a safety valve that is adapted to operate automatically to relieve any excessive pressure which may be generated within the tire. The safety valve has such a construction that it does not interfere at all with the ordinary operation of pumping up the tire, but if the pressure within the tire becomes excessive, said safety valve opens automatically to relieve the pressure.

In the drawings wherein I have shown a selected embodiment of my invention for the purpose of illustrating the principle thereof, Figure 1 is a vertical section through a valve embodying the invention; Fig. 2 is a section on the line *x—x*, Fig. 1; Fig. 3 is a detail view showing the safety valve open.

3 designates a portion of the rim of a wheel having thereon a pneumatic tire (not shown). Valves for pneumatic tires as now commonly constructed include a stem 5 having at one end a head (not shown) which is secured to the tire and which is provided with a bore 6 leading to the interior of the tire and within which bore is situated a check valve of some suitable construction. In my improvement I eliminate the check valve from the bore of the stem 5 and place a safety valve at the end of the stem and arrange my check valve beyond the safety valve. The check valve in my improvement is shown at 7 and it may be of any suitable or usual construction, it being confined within a hollow stem 8 which is herein shown as part of the safety valve. This stem 8 is arranged to slide loosely through a collar 9 that is sustained in the end of a casing 10, said casing being preferably cylindrical and being conveniently held in position by being screw-threaded to the stem 5, as shown at 11. At the lower end of the stem 8 is a head 12 having a bore 13 therein which communicates with the bore 6 of the stem 5. The end of the stem 8 is screw-threaded, as at 14, to receive the nipple of the pump and also to receive the usual cap 15. When the tire is being pumped up the end of the pump nozzle is secured to the stem 8 and upon operating the pump the air will be delivered through the ducts 13 and 6 into the tire in usual manner, the check valve 7 operating to prevent escape of air.

In embodying my improvements in a valve of this nature I place a safety valve between the check valve and the tire and while it is possible to make the safety valve in a variety of ways that herein shown has proved to be satisfactory and is my preferred construction. Secured to the screw-threaded end 17 of the stem 5 is a cap 16 having a gasket or sleeve 18 of rubber or other resilient material surrounding the same. The exterior surface of the gasket 18 is tapered as shown in Fig. 1, and it fits the interior tapered surface 19 of the bell-shaped head 12. The head 12 and the gasket 18 constitute a safety valve and under normal conditions the gasket 18 fits so tightly against the conical surface 19 of the head that the air will not escape between these parts. The head 12 is held against the gasket 19 by means of a suitable spring 20 which is shown as encircling the stem 8 and as bearing at one end against the head 12 and at the other end against the cap 9. The head 12 is preferably provided with a hub 21 which enters the lower end of the spring 20 and centers said end, and the cap 9 is preferably provided with the annular groove 22 in which the upper end of said spring is received and by which said end of the spring is centered. The cap 9 is screw-threaded into the upper end of the casing 10 and by adjusting said cap in the casing the tension of the spring 20 may be adjusted. The exterior of the head 12 is provided with one or more grooves 23, Fig. 2, and the cap 9 is provided with one or more vent apertures 24.

In the operation of the device the cap 9 is adjusted so as to place the spring 20 at the desired tension. Said spring 20 operates to hold the head 12 against the valve or gasket 18 with sufficient pressure so that no air can escape between these parts, and since the valve chamber in the stem 8 communicates directly with the duct 6 through the duct 13, it will be obvious that the tire may be pumped up in the usual way. If after the tire has been pumped up the air within the tire becomes heated sufficiently to create an excessive pressure within the tire, such pressure if sufficient will raise the head 12 (as seen in Fig. 3) by acting against the lower end thereof and will thus permit some of the air to escape between said head and the gasket or valve 18, the escaping air passing up through the grooves 23 and vent apertures 24. As soon as the tire has been relieved from excessive pressure the spring 20 will seat the head 12 against the gasket 18, thus closing the safety valve and preventing further escape of air.

By adjusting the cap 9 the spring 20 may be placed under such tension that the safety valve will lift at any predetermined pressure and thus by means of my invention it is possible to prevent a tire from bursting by the creation of an excessive pressure therein. The gasket 18 may be held to the bushing 16 in any suitable way. I will preferably, however, provide said bushing with a screw-threaded portion 26 onto which the gasket 18 is screwed. If desired the end of the casing 10 may be closed by a suitable cap 30. In applying my improved device to a pneumatic tire the casing 10 will preferably be screwed onto the stem 5 until said casing engages the rim 3, as shown in the drawing, and after the casing has been thus applied the bushing 16 with its gasket 18 may be applied to the screw-threaded end 17 of the stem 5. To permit this to be done the flange 28 of the bushing 16 may be provided with notches 29 to receive the arms of a spanner or tool by which the bushing may be screwed to the nipple 17. After the bushing is in place the head 12 and its stem may be dropped into position and the spring 20 applied to the stem and thereafter the cap 9 may be screwed into the casing 10.

The exterior of the head 12 is preferably cylindrical and accurately fits the interior of the cylindrical casing 10, and because of the comparatively long bearing surface between the head 12 and the casing 10, said head is guided accurately in its rising and falling movement and will always be firmly seated on the gasket 18. The cap 9 also assists in guiding the head 12 in its vertical movement.

Having fully described my invention, what I claim as new and desire to secure by Letters Patent is:

In a valve for pneumatic tires, the combination with a hollow externally threaded stem leading to the interior of the tire, of a valve member secured to the exterior of said stem at the end thereof, a cylindrical valve casing screw-threaded to the stem and inclosing said valve member, a coöperating spring-pressed cup-shaped valve member inclosing the first-named valve member and situated within and guided by said casing, said cup-shaped valve member having a stem extending outwardly therefrom and an inwardly-opening check valve within the stem, and a guiding member secured to and situated within said casing and through which the stem of the valve member plays.

In testimony whereof, I have signed my name to this specification, in the presence of two subscribing witnesses.

FRED T. CLAYTON.

Witnesses:
Louis C. Smith,
Thomas J. Drummond.